Oct. 17, 1939.     O. H. FOWLER     2,176,398
BRAKE
Filed Aug. 20, 1937
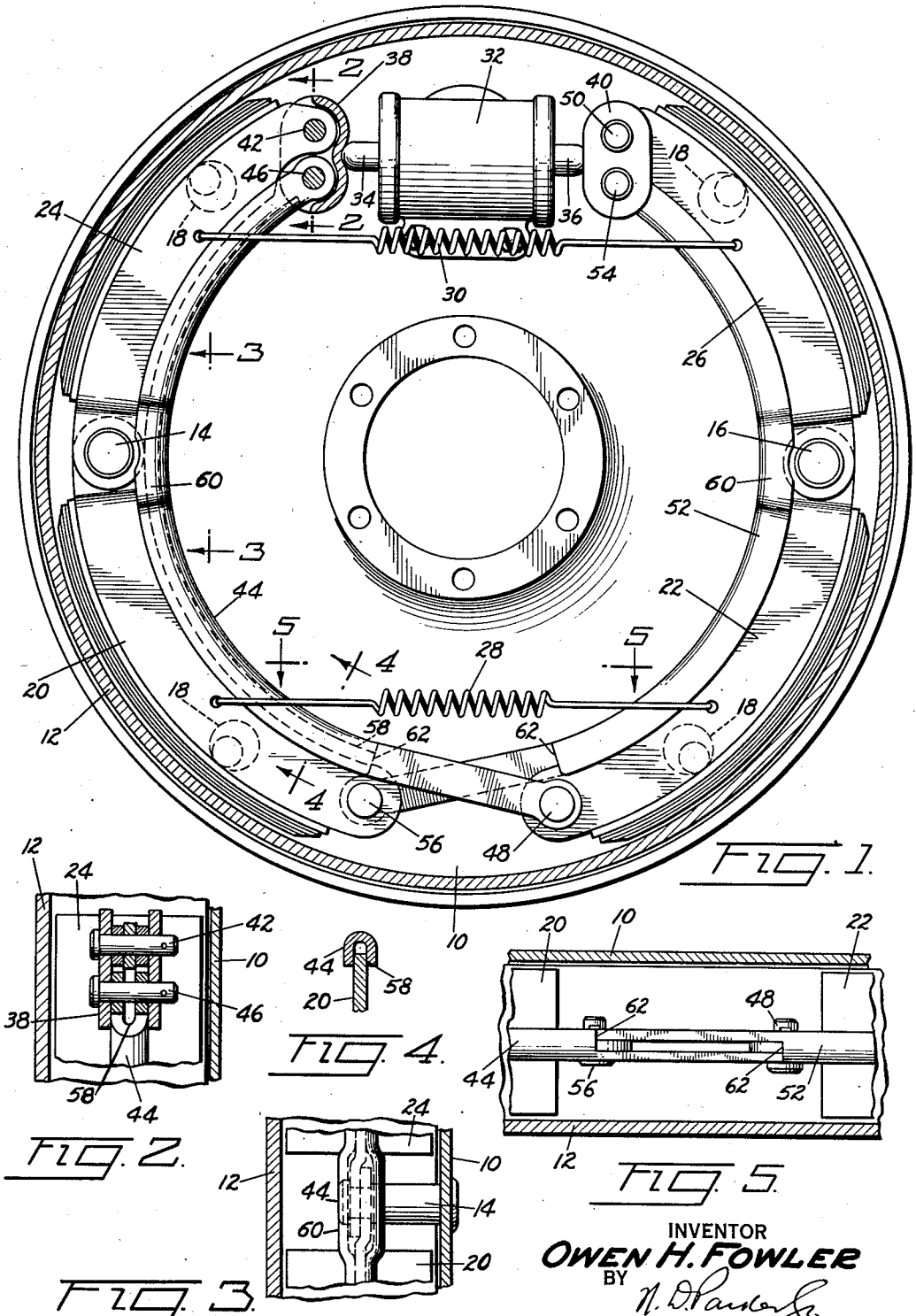
INVENTOR
OWEN H. FOWLER
BY
ATTORNEY Patented Oct. 17, 1939

2,176,398

UNITED STATES PATENT OFFICE 2,176,398

BRAKE

Owen H. Fowler, Detroit, Mich., assignor to Hydraulic Brake Company, Detroit, Mich., a corporation of California Application August 20, 1937, Serial No. 160,185

7 Claims. (Cl. 188—152)

This invention relates to brakes, and more particularly to brakes for motor vehicles.

Broadly the invention comprehends a brake of the internal expanding type including a fixed support, a rotatable drum associated therewith, two pairs of diametrically disposed friction elements or shoes mounted on the support for cooperation with the drum, and a fluid pressure motor for actuating the shoes with equal effectiveness.

An object of the invention is to provide a brake structure wherein the braking effort may be uniformly distributed.

Another object of the invention is to provide a brake structure including diametrically disposed friction elements or shoes arranged for actuation by a single force applying means.

Another object of the invention is to provide a brake structure including diametrically disposed friction elements or shoes and actuating means therefor operative to equalize the applied force.

A further object of the invention is to provide a brake structure including a fixed support, a rotatable drum associated therewith, two pairs of diametrically disposed shoes pivoted on the support for cooperation with the drum, equalizers connecting one shoe of each pair to the diametrically disposed shoe of the other pair, and a fluid pressure actuated motor connected between the equalizers.

Other objects of the invention will appear from the following description taken in connection with the drawing forming a part of this specification, and in which—

Fig. 1 is a vertical sectional view of a brake taken just back of the head of the drum, illustrating the invention as applied;

Fig. 2 is a sectional view substantially on line 2—2, Fig. 1;

Fig. 3 is a sectional view substantially on line 3—3, Fig. 1;

Fig. 4 is a sectional view substantially on line 4—4, Fig. 1; and

Fig. 5 is a sectional view substantially on line 5—5, Fig. 1.

Referring to the drawing for more specific details of the invention, 10 represents a fixed support or backing plate having associated therewith a rotatable drum 12. The backing plate has thereon diametrically disposed anchors 14 and 16 and suitable retractile stops 18, and corresponding interchangeable friction elements or shoes 20, 22, 24 and 26 of conventional type are mounted on the anchors for cooperation with the drum.

The shoes 20 and 24 have their articulate ends pivoted to the anchor 14, and the shoes 22 and 26 have their articulate ends pivoted to the anchor 16. The shoes 20 and 22 are connected by a retractile spring 28, and, correspondingly, the shoes 24 and 26 are connected by a retractile spring 30. The springs 28 and 30 serve to return the shoes, upon the completion of a braking operation, to their retracted positions against the stops 18, where they are supported in proper spaced relation to the drum.

A fluid pressure actuated motor 32 of conventional type, mounted on the backing plate between the force applying ends of the shoes 24 and 26 and adapted to be connected to a suitable source of fluid pressure, includes opposed pistons, not shown, and thrust pins 34 and 36 carried by the respective pistons.

Corresponding equalizers 38 and 40 receive the thrust pins 34 and 36. One end of the equalizer 38 is pivotally connected to the shoe 24 as indicated at 42, and the other end of this equalizer is pivotally connected to one end of a force transmitting rod 44 as at 46, and the other end of the force transmitting rod is pivotally connected to the force applying end of the shoe 22 as indicated at 48. Correspondingly, one end of the equalizer 40 is pivoted to the shoe 26 as at 50, and the other end of this equalizer is pivotally connected to one end of a force transmitting rod 52 as at 54, the other end of this force transmitting rod being pivotally connected as at 56 to the force applying end of the shoe 20.

The force transmitting rods 44 and 52 each include a strip of metal bent upon itself to provide a channel 58, and the rods are deformed to correspond to the curvature of the webs of the shoes. Substantially centrally of the length of the rod, the channel is increased in width as at 60 so as to straddle the pivoted ends of the shoes, and that portion of the rod adjacent its pivotal connection with the force applying end of the shoe actuated thereby is cut away as indicated at 62.

The channel 56 and the rod 44 receive the webs of the shoes 20 and 24, and that portion of the channel having an increased width receives the overlapping portions of the shoes 20 and 24 at the anchor 14. Correspondingly, the channel 56 of the rod 52 receives the webs of the shoes 22 and 26, and that portion of the channel having an increased width receives the overlapping end portions of the shoes 22 and 26 at the anchor 16. The cutaway portions 62 of the rods 40 and 52 overlap one another adjacent the force applying ends of the shoes 20 and 22 so as to materially decrease the overall thickness of the rods due to this overlapping condition.

In a normal operation, upon actuation of the fluid pressure motor 32, force is transmitted therefrom in opposite directions through the thrust pins 34 and 36 to the equalizers 38 and 40. The force received by the equalizers is distributed and transmitted with equal effectiveness to the toes or force applying ends of the shoes 24 and 26, and through the force transmitting rods 44 and 52 to the toes or force applying ends of the shoes 20 and 22. This results in moving the shoes into engagement with the drum against the resistance of the retractile springs 28 and 30 and effectively retarding rotation of the drum.

Due to the distribution of the applied force, the diametrically disposed shoes of the respective pairs are actuated simultaneously with equalized braking effort. Because of this particular feature, the effective braking area is materially increased and the braking effort is uniformly distributed on the braking surface of the drum, thus inhibiting drum distortion.

Upon the conclusion of a braking operation, the applied force is released, whereupon the shoes of the respective pairs are returned to their retracted or normal positions against the stops 18 by the retractile springs 28 connecting the shoes 20 and 22 and the retractile springs 30 connecting the shoes 24 and 26. The retractile springs 28 and 30 also serve to retain the shoes against the stops 18 in proper spaced relation to the drum.

Although this invention has been described in connection with certain specific embodiments, the principles involved are susceptible of numerous other applications that will readily occur to persons skilled in the art. The invention is, therefore, to be limited only by the scope of the appended claims.

Having thus described the various features of the invention, what I claim as new and desire to secure by Letters Patent is:

1. A brake comprising diametrically disposed pairs of shoes, linkage including an equalizer connecting one shoe of each pair to the diametrically disposed shoe, and a fluid pressure actuated motor connected between the equalizers.

2. A brake comprising diametrically disposed pairs of shoes, linkage including an equalizer connecting the toe of one shoe of each pair to the toe of the diametrically disposed shoe, and a fluid pressure actuated motor connected between the equalizers.

3. A brake comprising diametrically disposed pairs of shoes, an equalizer connected to one shoe of each pair and to the diametrically disposed shoe of the other pair, and a fluid pressure motor connected between the equalizers.

4. A brake comprising a fixed support, a drum associated therewith, diametrically disposed anchors on the support, a pair of shoes pivoted on each anchor, linkage including an equalizer connecting one shoe of each pair to the diametrically disposed shoe, and a fluid pressure actuated motor connected between the equalizers.

5. A brake comprising a fixed support, a rotatable drum associated therewith, anchors diametrically disposed on the support, a pair of shoes pivoted on each anchor for cooperation with the drum, an equalizer pivoted to the force applying end of one shoe of each pair, force transmitting rods connecting the equalizers to the force applying end of the other shoe of each pair, and a motor connected between the equalizers.

6. A brake comprising a fixed support, a rotatable drum associated therewith, anchors diametrically disposed on the support, a pair of shoes pivoted on each anchor for cooperation with the drum, an equalizer connected to the force applying end of one shoe of each pair, a force transmitting rod connecting the force applying end of the other shoe of each pair to the equalizer, and a motor connected between the equalizers.

7. A brake comprising a fixed support, a rotatable drum associated therewith, anchors diametrically disposed on the support, a pair of shoes pivoted on each anchor for cooperation with the drum, an equalizer connected to the force applying end of one shoe of each pair, rods slidable on the respective pairs of shoes and connecting the equalizers to the force applying ends of the shoes diametrically disposed to the shoes connected to the equalizers, and a motor connected between the equalizers.

OWEN H. FOWLER.